United States Patent [19]

Cheung et al.

[11] Patent Number: 5,535,217

[45] Date of Patent: *Jul. 9, 1996

[54] METHOD AND APPARATUS FOR PROBABILISTIC CLOCK SYNCHRONIZATION WITH INTERVAL ARITHMETIC

[75] Inventors: Yiu M. Cheung; Kenneth K. W. Ng, both of Scarborough, Canada; Hovey R. Strong, Jr., San Jose, Calif.

[73] Assignee: International Business Machines Corporation, Armonk, N.Y.

[ * ] Notice: The term of this patent shall not extend beyond the expiration date of Pat. No. 5,245,025.

[21] Appl. No.: 363,421

[22] Filed: Dec. 20, 1994

[51] Int. Cl.$^6$ ...................................................... H04J 3/06
[52] U.S. Cl. ................................. 370/100.1; 395/200.19
[58] Field of Search .............................. 370/100.1, 103; 375/354, 356, 358; 395/200.19, 550; 340/825.14, 825.2, 825.21

[56] References Cited

U.S. PATENT DOCUMENTS

| | | | |
|---|---|---|---|
| 3,940,558 | 2/1976 | Gabbard et al. | 178/69.5 |
| 4,142,069 | 2/1979 | Stover | 179/15 BS |
| 4,531,185 | 7/1985 | Halpern et al. | 364/200 |
| 4,584,643 | 4/1986 | Halpern et al. | 364/200 |
| 4,599,735 | 7/1986 | Surie et al. | 375/54 |
| 4,709,347 | 11/1987 | Kirk | 364/900 |
| 4,782,499 | 11/1988 | Clendening | 375/113 |
| 4,866,606 | 9/1989 | Kopetz | 364/200 |
| 4,926,446 | 5/1990 | Grover et al. | 375/109 |
| 4,939,753 | 7/1990 | Olson | 375/107 |
| 5,041,966 | 8/1991 | Nakai et al. | 395/550 |
| 5,062,124 | 10/1991 | Hayashi et al. | 375/107 |
| 5,142,470 | 8/1992 | Bristow et al. | 364/184 |
| 5,327,468 | 6/1994 | Edblad et al. | 375/356 |
| 5,428,645 | 6/1995 | Doleu et al. | 375/354 |

FOREIGN PATENT DOCUMENTS

| | | | |
|---|---|---|---|
| 0391144A | 10/1990 | European Pat. Off. | H03L 7/07 |
| 0505281A1 | 9/1992 | European Pat. Off. | H04J 3/06 |
| 59-176863 | 10/1984 | Japan | G06F 15/16 |
| 60-55466 | 3/1985 | Japan | G06F 15/16 |

OTHER PUBLICATIONS

F. Cristian et al., Decentralizing Technique Applied to Master-slave Clock Synchronization, IBM Tech. Disclosure Bulletin, vol. 33, No. 8, Jan. 1991.
F. Cristian, Probabilistic Clock Synchronization, IBM Tech. Disclosure Bulletin, vol. 31, No. 2, Jul. 1988.
F. Cristian, Probabilistic Clock Synchronization, IBM Research Report, RJ 6432 (62550) Sep. 23, 1988.
Keith A. Marzullo, Maintaining the Time in a Distributed System: An Example of a Loosely-Coupled Distributed Service, (Dissertation) 1984.
Distributed Computing Environment, Time Service Specification, Version T1.1.0, Jun. 11, 1991.

*Primary Examiner*—Hassan Kizou
*Attorney, Agent, or Firm*—James C. Pintner

[57] ABSTRACT

A probabilistic dock synchronization scheme for synchronization of time docks between nodes on a communication network is disclosed, in which a round trip exchange of messages is used to establish that one time according to a first time scale falls between two times according to a second time scale. A time related to the two second time scale times, preferably midway between the two times, is used for synchronizing with the time according to the first time scale. Each time is given in terms of a time value and a plus-or-minus precision range, thereby defining an interval. Enhanced precision is achieved by computing a new precision range for the synchronized time based on an intersection between the intervals of the related time and the time according to the first time scale.

28 Claims, 11 Drawing Sheets

PROBABILISTIC CLOCK SYNCHRONIZATION

METHOD AND APPARATUS FOR PROBABILISTIC CLOCK SYNCHRONIZATION WITH INTERVAL ARITHMETIC

FIELD OF THE INVENTION

The invention generally relates to the field of multiprocessing systems and architecture. More specifically, the invention has to do with synchronizing time representations, or "clocks," maintained by various processors in a multiprocessing network.

BACKGROUND OF THE INVENTION

In many applications, computers and processors maintain some form of real time for reference and sequencing purposes, and for the purpose of synchronization of activities with other computers or processors. In particular, in network and multiprocessing architectures, such as that shown in FIG. 11, time synchronization between network nodes 100 is important. The common terminology is to say that a node maintains a "clock", and that "clock synchronization" is the process by which the nodes maintain the time values of their clocks.

Generally, such devices maintain a register or other hardware or software structure which contains a representation of real time. This time representation can be either a political time (such as Universal Time, Greenwich Mean Time, Eastern Standard Time, etc.) or some suitable form of logical time. In either case, the device maintaining the time representation updates the time internally on a real time basis. For instance, a processor might have a hardware oscillator which provides a signal at a known real time interval, measured in terms of system hardware clock cycles. Responsive to the signal, the processor updates its internal time in accordance with the known real time interval between signals.

In addition to maintaining and updating time internally, a processor or network node synchronizes its internal time with an external reference time source 102. A processor which has been synchronized to an external time source measures time in accordance with its internal hardware clock, which operates at a known frequency. Since the hardware clock frequency is inevitably not perfectly accurate, as time goes by the internal time maintained by a processor diverges from the external time with which the processor was previously synchronized. This time divergence is sometimes called "clock drift". Typically the processor's time drifts away from the external time as a linear function of elapsed time since synchronization. To prevent the clock drift from getting too large, from time to time the processor resynchronizes its internal time with the external reference time.

In general, a time is represented, not as a single time value, but rather as an interval, such as a time value, plus or minus an error bound value. A time expressed as an interval is considered to be "correct" if a reference time falls within that interval. For instance, if the time according to an external reference is 12:00:00, then a time representation of 11:59:50±0:00:15, which runs from 11:59:35 to 12:00:05, would be considered correct.

Because of clock drift, a time representation must gradually increase the error bound in order to remain correct. Eventually, the error bound grows large enough to be disadvantageous or unsuitable for operation. Then, a resynchronization procedure is executed, and a new time is adopted. In particular, the resynchronization procedure produces a new, smaller error bound to go with the new time.

Various arrangements may be used for providing a reference time source. For instance, in a network comprising a plurality of nodes, one of the nodes serves as a repository of a reference time. All other nodes of the network are synchronized with that node's time. Another time synchronization method involves reception of a reference time from a time source external to the network. Time services exist, which provide accurate time information for various purposes, including computer or network synchronization. One well known time service is WWV, which broadcasts a Universal Time signal. WWV and other similar time sources may be used to provide time synchronization to computers and processors.

As described above, a processor which is synchronized with such a time source gradually drifts out of synchronization. Also, time sources such as WWV occasionally introduce "leap seconds" to synchronize their time with the motions of the planet Earth. To prevent error from accumulating due to drift and leap seconds, it is particularly desirable that a processor synchronize itself with an external time source from time to time in the normal course of its operation.

In architectures in which a predetermined node is a reference time source, or in which an external reference time source, such as a subscription time service, is coupled through a suitable communication link or interface 104 to a predetermined node of a network, the predetermined node may be characterized as a master node. In order for the master node to synchronize other nodes, the master node conventionally must know which other nodes it is responsible for updating, so that it can direct appropriate time update messages to those nodes. The master node sends synchronization messages to other nodes coupled to the network, which are slave nodes relative to the predetermined node.

In addition, to guarantee that the slave nodes are properly updated, the master node must receive responses from each of the slave nodes. In this scenario, a round trip scheme is employed between each slave node and the master node, in which a message is sent and then an acknowledgement is awaited. A round trip scheme is also employed if a slave node sends a synchronization request message to the master node, and the master node responds by sending a synchronization message. The inaccuracy of time provided to a slave node in these scenarios is directly related to the total elapsed time for the round trip sequence of messages. Thus, the precision with which clock synchronization can be achieved is limited by the time required for round trip synchronization.

ROUND TRIP CLOCK SYNCHRONIZATION

A more detailed description of round trip synchronization will now be given. A particular type of round trip synchronization, called Probabilistic Clock Synchronization (hereinafter PCS) has been used for synchronizing internal times of nodes with reference time from a designated reference node or from an external source. The technique is described in Cristian, "Probabilistic Clock Synchronization", IBM Technical Disclosure Bulletin, Vol. 31, No. 2 (July 1988), p. 91.

The basic round trip synchronization sequence works as follows: A slave node sends a synchronization request at a time t, according to its clock. A master responds with a message giving a time T, according to the master's time clock. The slave receives the response at a time t', according to its clock. It is thus established that the master's time T falls somewhere within the time interval between the slave's times t and t'. The slave then updates its internal time in accordance with a difference between the reference time T and an internal time somewhere between t and t'.

(Note that the above paragraph presupposes that the slave node is to synchronize its clock with the reference time falling between two of its local times. The reverse can also be done; that is, two reference times can be obtained, a local time falling between the two reference times, and the local time can be synchronized with a time falling between the two reference times.)

While the reference time T can be synchronized with any local time t* within the interval from t to t', the precision is given by the larger of the two differences t*−t and t'−t*. To minimize this interval, and therefore make the precision as good as possible, it is preferable to synchronize T with the midpoint of the interval between t and t'. That is, T is synchronized with the local time t* =(t'−t)/2. Thus, the precision of the slave node's synchronization is accurate to within (t'−t)/2.

In particular, Cristian's PCS technique includes checking the precision which is achievable from a given set of times identified as above. If the achievable precision is not considered good enough, the round trip message exchange sequence is repeated to provide another set of time intervals with which the above method can be used to synchronize the slave node. If the process is repeated until a suitably short interval is obtained, the precision of synchronization is improved.

Thus, the probabilistic clock synchronization technique described in Cristian advantageously provides both synchronization and a quantitative estimation of the precision of synchronization, i.e., an upper bound of synchronization error. However, because this technique uses a round trip protocol for providing synchronization intervals to slave nodes on an individual basis, it has the drawback that the bidirectional message protocol requires a substantial amount of processing overhead. This is particularly true for the reference time source, which must go through the synchronization protocol for each slave node for which the master is responsible. As a consequence, the time interval t'−t is of a size commensurate with the processing time. It would be desirable to perform clock synchronization using a smaller interval, and thereby improve the accuracy of synchronization.

A further complication is added when it is taken into account that each of the three times t, T, and t' has a precision value associated with it. That is, instead of having one discrete point in time, according to a first time scale, falling somewhere between two discrete points in time, according to a second time scale, each of the three points in time has a "halo," or plus-or-minus precision range, surrounding it. A clock synchronization scheme should take these precision ranges into account, in determining the accuracy of synchronization.

With this additional consideration of plus-or-minus precision ranges in mind, the Background section of this patent application will conclude with a discussion of the intervals in a PCS sequence, in terms of a notating convention describing both times and precision intervals. This same notation will be used further in the discussion of the invention which follows.

Round trip synchronization, in essence, follows the following steps, which will be illustrated with reference to the timing diagram of FIG. 1. For clarity, FIG. 1 shows plus-or-minus precision ranges which are small, relative to the intervals between the time points, and which therefore do not intersect. In some realistic situations, however, there may be substantial overlap between the intervals.

Process A obtains a time stamp, from its local clock, of a time T, plus or minus a precision estimate P (2). Next, Process A sends a message (4) to Process B, which receives the message some time later. Process B then obtains a time stamp, from its local clock, of a time U, plus or minus a precision estimate Q (6). Process B then sends a response (8) back to Process A, which receives the response at a still later time. Upon receipt, Process A obtains, from its local clock, a time stamp of a time V plus or minus a precision estimate R (10).

A PCS scheme selects a time, in terms of Process A's time scale, which is to be treated as equal to the Process B time Q, for synchronization. As discussed above, the midpoint (V+T)/2 of the interval between the two Process A times T and V produces the best precision (12). Therefore, when performing PCS synchronization, the Process B time U (6) and the midpoint (V+T)/2 of the interval between the Process A times T and V are synchronized with each other.

This synchronization involves changing Process A's time by the difference between U and (V+T)/2 (14). Process A's current time is V, so the synchronization process adds (U−(V+T)/2) to V, to produce the resynchronized time U+(V−T)/2 (16).

Next, the precision values Q and R and the interval V−T are used to compute a precision range for the new synchronized value. According to Process B, the precision at time U was plus or minus Q. Since the new precision can be as great as (V−T)/2, that is, half of the interval between T and V, and since there is already an existing precision of Q, the new precision s the sum of these two terms, or Q+(V−T)/2.

In summary, given the above sequence of messages, a single round trip according to the PCS scheme produces, for Process A, a new time U+(V−T)/2 plus or minus a precision of Q+(V−T)/2. The endpoints of this new interval, as of the present time, are U−Q and U+Q+V−T.

This new time, including the time value itself and the precision interval, is adopted as Process A's new time if (i) the precision Q+(V−T)/2 is less than Process A's current precision R, and (ii) the precision is less than a user supplied parameter, a requested precision. (The smaller the precision value, the better the precision.) If one of these two conditions is not met, the preexisting Process A time and precision interval of V plus or minus R is kept. Another PCS round trip may then be attempted, to try to obtain a precision good enough to adopt. However, as discussed above, it would be desirable further to improve precision of synchronization.

SUMMARY OF THE INVENTION

It therefore is an object of the invention to provide a clock synchronization method which has the advantages of probabilistic clock synchronization, and which also provides enhanced synchronization accuracy.

To achieve this and other objectives, there is provided in accordance with the invention a method for synchronizing the time representations of nodes in a multiprocessing network. The network typically includes first and second nodes coupled to a communication network. Each of the first and second nodes maintains a respective time representation to within a respective precision.

The method includes the initial step of obtaining one time value for each of two time scales maintained by two nodes which are to be synchronized with each other. This is preferably done using a suitable method, such as a Probabilistic Clock Synchronization or other round trip method, by exchanging a predetermined sequence of messages between the first and second nodes. As described above, the midpoint between the two Process A times and the Process B time are used as the time values for the two time scales.

More specifically, the time values are to be obtained in terms of an instantaneous time value and a precision value, such as a plus-or-minus accuracy range or interval. As will be discussed in detail below, the intervals of the two times will have one of a predetermined set of intersection patterns.

The method further includes the step of computing a new estimated correct time, and a new precision range about the estimated correct time. The estimation is made in terms of the time values and precision ranges of the intervals of the exchanged messages. In accordance with the invention, this step employs a technique of noting the intersection, if any, between the time-and-precision-value intervals for the two time scales. The intersection, if any, between the two intervals is treated as a new interval for the newly resynchronized time.

To produce an instantaneous time value and a plus-or-minus precision interval surrounding the instantaneous time value, the intersection interval is bisected to determine its midpoint. The midpoint thus produced is the new time value. Also, one half of the length of the intersection interval is used as the new precision. As a result, the plus-or-minus precision range of the new synchronized time value is identical to the intersection interval.

It will be understood that two intervals can intersect in several different ways. Referring back to the final portion of the Background, the endpoints of the possible intersection intervals are given in terms of the times T, U, and V, and the precisions P, Q, and R. As a consequence, the calculation of the new time and precision is made from one of a predetermined number of respective formulas. The formulas correspond with the intersection patterns of the possible intersection intervals, and the particular formula used is the one which corresponds with the intersection pattern of the intervals in the particular case.

While the invention is primarily disclosed as a method, it will be understood by a person of ordinary skill in the art that an apparatus (FIG. 12), such as a conventional data processor 200, including a CPU 202, memory 204, I/O 206, program 208, a connecting bus 210, and other appropriate components, could be programmed or otherwise designed to facilitate the practice of the method of the invention. Such a processor would include appropriate program means for executing the method of the invention. Also, an article of manufacture, such as a pre-recorded disk 212 or other similar computer program product, for use with a data processing system, could include a storage medium and program means recorded thereon for directing the data processing system to facilitate the practice of the method of the invention. It will be understood that such apparatus and articles of manufacture also fall within the spirit and scope of the invention.

DESCRIPTION OF THE PREFERRED EMBODIMENT

Figure 2:
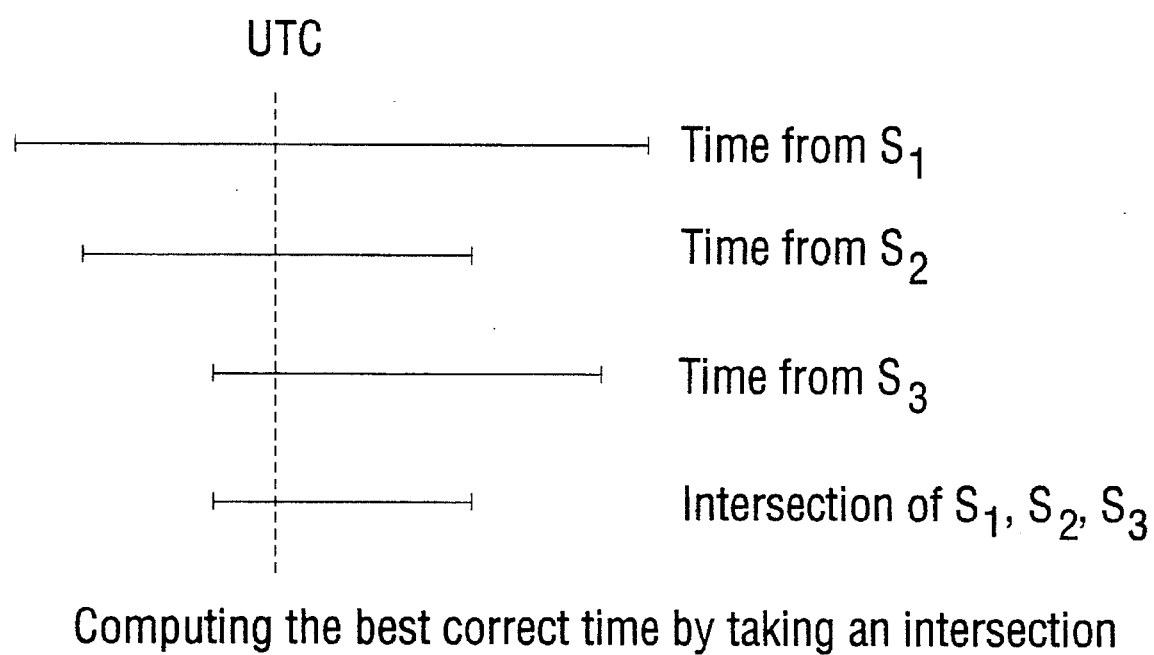
FIG. 2 is a timing diagram showing the conventional use of the intersection of intervals to establish a correct time for synchronization, as taught in Distributed Computing Environment, Time Service Specification, Version T1.1.0 (Jun. 11, 1991), Section 2.3, pp. 8–11.

Initially, a discussion of the use of the intersection of intervals for obtaining a correct time for synchronization will be discussed, in connection with the prior art teaching in Distributed Computing Environment, Time Service Specification, Version T1.1.0 (Jun. 11, 1991), Section 2.3, pp. 8–11. FIG. 2 of the present patent application is reproduced from FIG. 2.2 of this document.

A plurality of times are received from one or more Time Providers, such as external reference time sources or time services. Each of the received times includes a precision range. Accordingly, the times are shown in FIG. 2 as intervals in time lines.

The intervals from the different Time Providers need not be identical to each other, and are likely to be somewhat different from each other, due to factors such as clock drift. Moreover, it is possible that one or more of the Time Providers might be faulty, and therefore that its time interval might be far away from the correct time.

Assuming that all of the intervals were provided by operational Time Providers, it will likely be the case that all of the intervals have a finite intersection, and it may be assumed that the correct time falls within that intersection of the intervals. An example is shown in FIG. 2, in which a correct Universal Coordinated Time (UCT) falls within the intersection of three intervals $S_1$, $S_2$, and $S_3$.

An additional discussion of intervals in connection with clock synchronization from multiple time sources is given in Marzullo, "Maintaining the Time in a Distributed System: An Example of a Loosely-Coupled Distributed Service", Ann Arbor, Mich.: University Microfilms International (1984), a Stanford University Ph.D. dissertation.

Marzullo recognizes that, in a distributed system, a clock time is given in terms of a clock value and an error bound, thus given as a time interval. See Section 2.2 and FIG. 2.1 in Marzullo. Additionally, Marzullo teaches a scheme for using intersection of intervals in connection with clock synchronization in distributed systems, in sections 3.1 and 3.2. Assuming that there are several clock sources, each having an interval made up of a time and a precision range, Marzullo teaches finding an intersection of the intervals for all of the time sources (if there is such an intersection), and using that intersection interval for synchronization. The intersection interval is made up of the greatest lower bound and the least upper bound. Typically, for fairly accurate clock sources, this intersection interval will be finite in size, but smaller than any one of the intervals for any of the individual clock sources. The intersection interval may then be used to establish a precision range for the newly synchronized time.

THE INVENTION

The present invention utilizes the basic theory of interval intersections as applied to clock synchronization in a context different from that which Marzullo contemplated. In Marzullo's context, several different remote clock sources send times, including precision ranges given as intervals, to a local node wishing to synchronize its internal clock. The intervals have some intersection, which is then used for the synchronization.

By contrast, the present invention is applicable to situations where a local node seeks to synchronize its local clock, and only a single remote clock are available. As a consequence, there will not be multiple external times to intersect, as was the case with Marzullo's scheme. Through a suitable process, such as a round trip message exchange sequence, the local node identifies a local time and a remote time, each having a precision range given in terms of a time interval, which are to be used for the synchronization. Then, the intersection of the two intervals is used to establish the new, synchronized time, including its precision range.

Let us now return to the PCS sequence described in the Background. In accordance with the PCS scheme, as modified in accordance with the invention, the midpoint $(T+V)/2$ between Process A's two time stamps T and V is to be synchronized with the time stamp U from Process B, and a precision range is to be calculated for the newly synchronized time, based on the times T, U, and V, and their respective precisions P, Q, and R.

For the discussion which follows, it will be assumed that Process A (the process whose two times surround the Process B time), is the local node, and is the node whose time value will be adjusted. However, it will be understood that the local node whose time is to be adjusted could also be the Process B node, whose time falls between the two received Process A time stamps. The method of the invention works either way.

If there were no precisions to worry about, but merely instantaneous time values, then Process A would adjust its clock to compensate for the difference between U and $(T+V)/2$. However, because each time stamp has a precision interval associated with it, the synchronization problem is not the difference between two instantaneous points according to two time scales, but rather the synchronization of two time intervals according to two time scales.

Initially the midpoint between T and V is taken as the Process A instantaneous time which is to be used for synchronization. Next, the precision interval around that point must be determined. Assuming that the precision interval for Process A increases with time, due to factors such as clock drift, it will be understood that at time $(T+V)/2$, the precision was somewhere between P and R.

However, in accordance with the invention, it is taken into account that the time is no longer $(T+V)/2$ or U, but the later time V (or actually a little later than V, allowing for processing time). Therefore, the additional clock drift between the two Process A times $(T+V)/2$ and V has caused the precision error to grow from P to R (or actually a little greater than R, allowing for the additional clock drift which accrues during the processing time). Therefore, for the purpose of comparing intervals for synchronization, the precision error about the midpoint $(T+V)/2$ is taken as R. That is, one of the two intervals to be intersected is the Process A interval, $(T+V)/2 \pm R$.

The Process B interval provided with the response message was $U \pm Q$. This could be used as the interval. However, in accordance with the PCS message exchange scheme, the Process B time U could fall anywhere between T and V. As a consequence, the precision of the Process B interval is expanded to include the maximum possible additional error, $(V-T)/2$. Thus, instead of the Process B interval being $U \pm Q$ as per the response message, the Process B interval will now be $U \pm (Q+(V-T)/2)$.

From the above discussion, expressions have been defined which identify midpoints and endpoints for the two intervals, identified through use of the PCS message exchange scheme, which are to be intersected, in accordance with the invention, to provide a synchronization time and precision range.

For the two intervals, there are four possible intersection patterns. These four patterns are shown in FIGS. 3, 4, 5, and 6. These four FIGURES are timing diagrams, in which the two intervals are shown on time lines labeled for the respective processes whose times are depicted on the time lines. The endpoints of the time intervals are labeled in accordance with the derived expressions given above. For each pair of intervals, a third interval is given, showing the intersection of the two intervals.

Note that a fifth possibility is that the intervals do not intersect at all. If this were the case, then the PCS round trip message exchange will have failed to produce intervals upon which synchronization can take place. Another attempt to run the PCS message exchange may then be made, to try again to get suitable intervals. Alternatively, this failure of the intervals to intersect at all may be taken as a system failure or a catastrophic failure of clock synchronization, and an alarm or appropriate diagnostic procedure may then be invoked.

Figure 3:
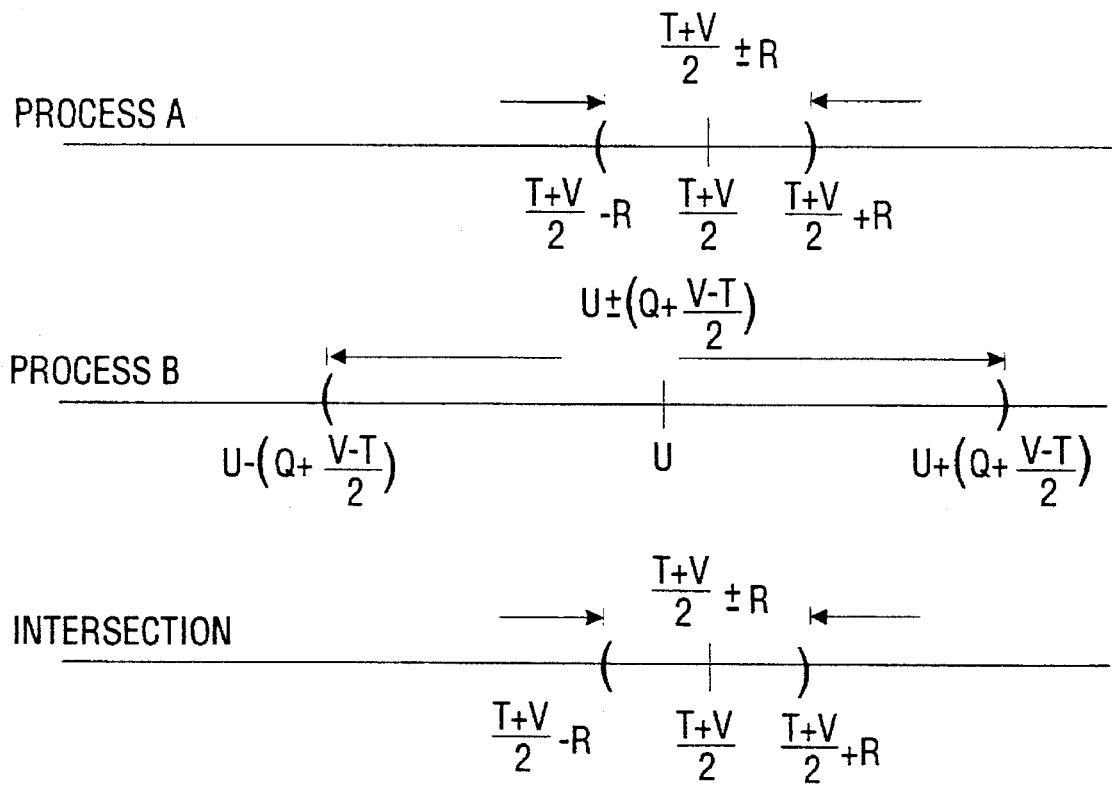
FIGS. 3, 4, 5, and 6 are timing diagrams showing four possible intersection patterns for two intervals, the intersection patterns being used, in accordance with the invention, for time synchronization.
Figure 4:
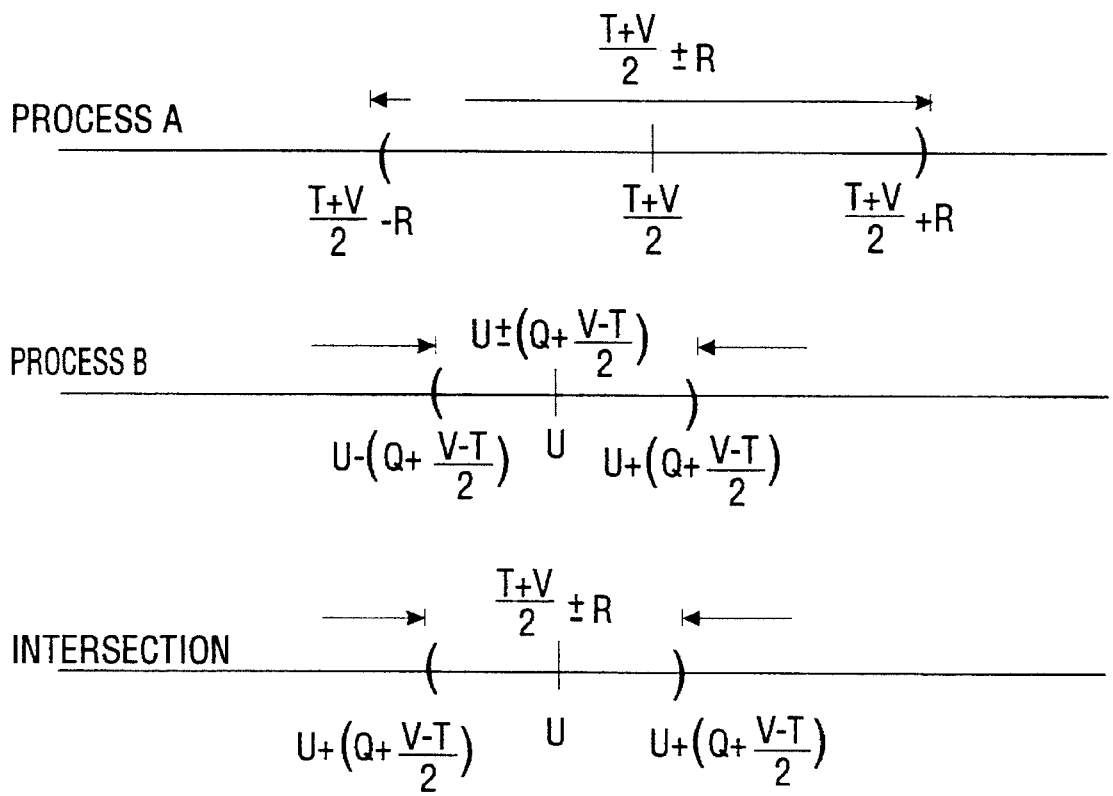

Let us now consider the four possible intersection intervals given, to see how they are used, in accordance with the invention, to obtain better precision in synchronization. In the case of FIGS. 3 and 4, one interval is contained entirely within the other, so the intersection is equal to the shorter of the two intervals. These two cases correspond with conventional PCS.

Let us consider first FIG. 3. Process A, whose time is to be adjusted for synchronization, has a relatively narrow precision range of $((T+V)/2) \pm R$. The Process B time has a larger precision range, as shown, so Process A's precision would not improve if Process A performed a synchronization based on this exchange of messages. Accordingly, Process A does not perform a synchronization based on this message exchange. Instead, Process A initiates another message exchange, takes other appropriate action or just maintains its current time. The scenario in FIG. 3 is equivalent to the conventional PCS scenario where the message exchange does not provide for synchronization which improves, in precision, on the current time.

Next, let us consider FIG. 4. Here, the Process B time interval is smaller than the Process A time interval. Process A would improve its precision by synchronizing with the Process B time, and therefore does so. This is equivalent to the conventional PCS scenario where the message exchange does provide for synchronization which would improve Process A's precision.

Figure 5:
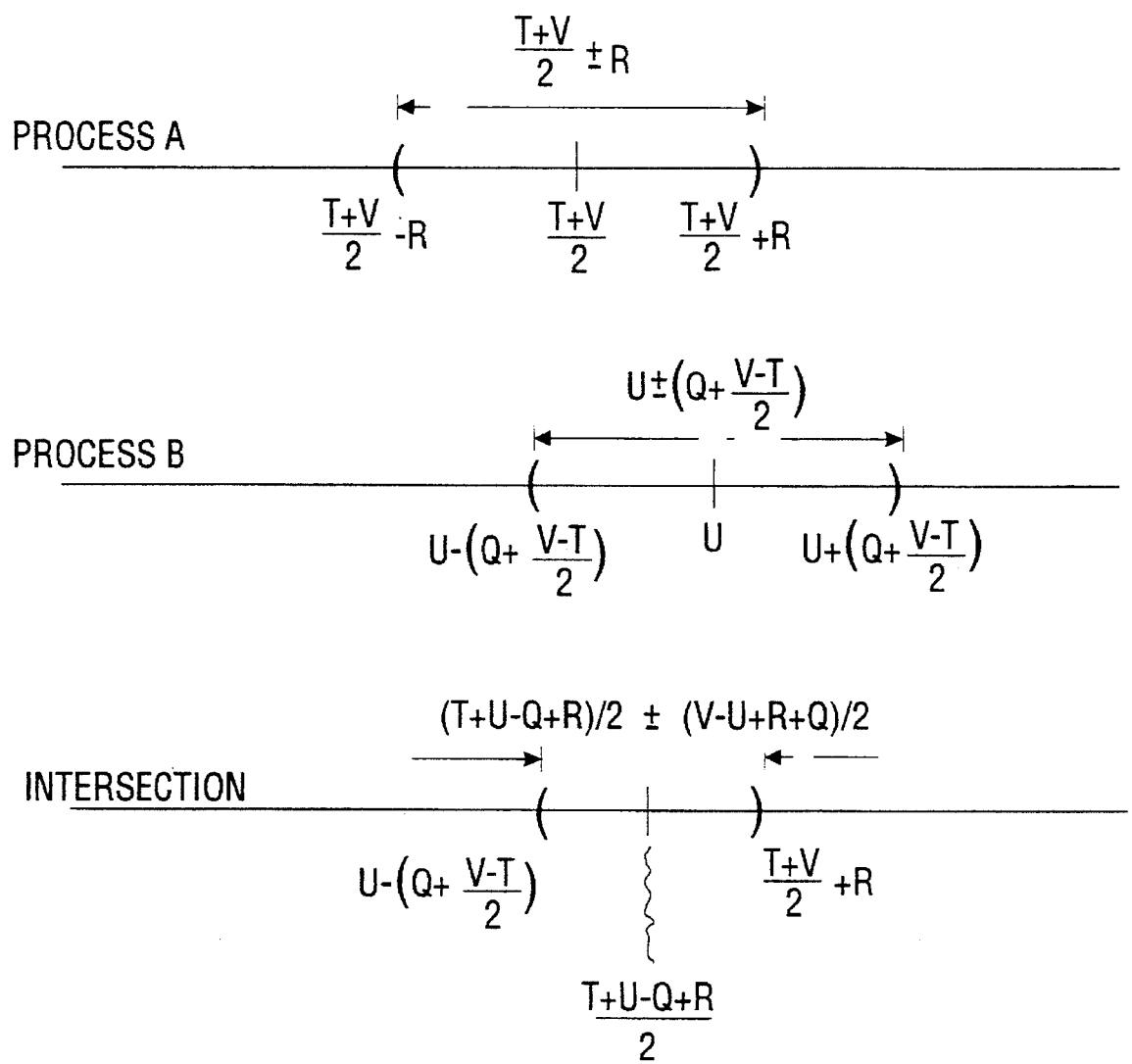
Figure 6:
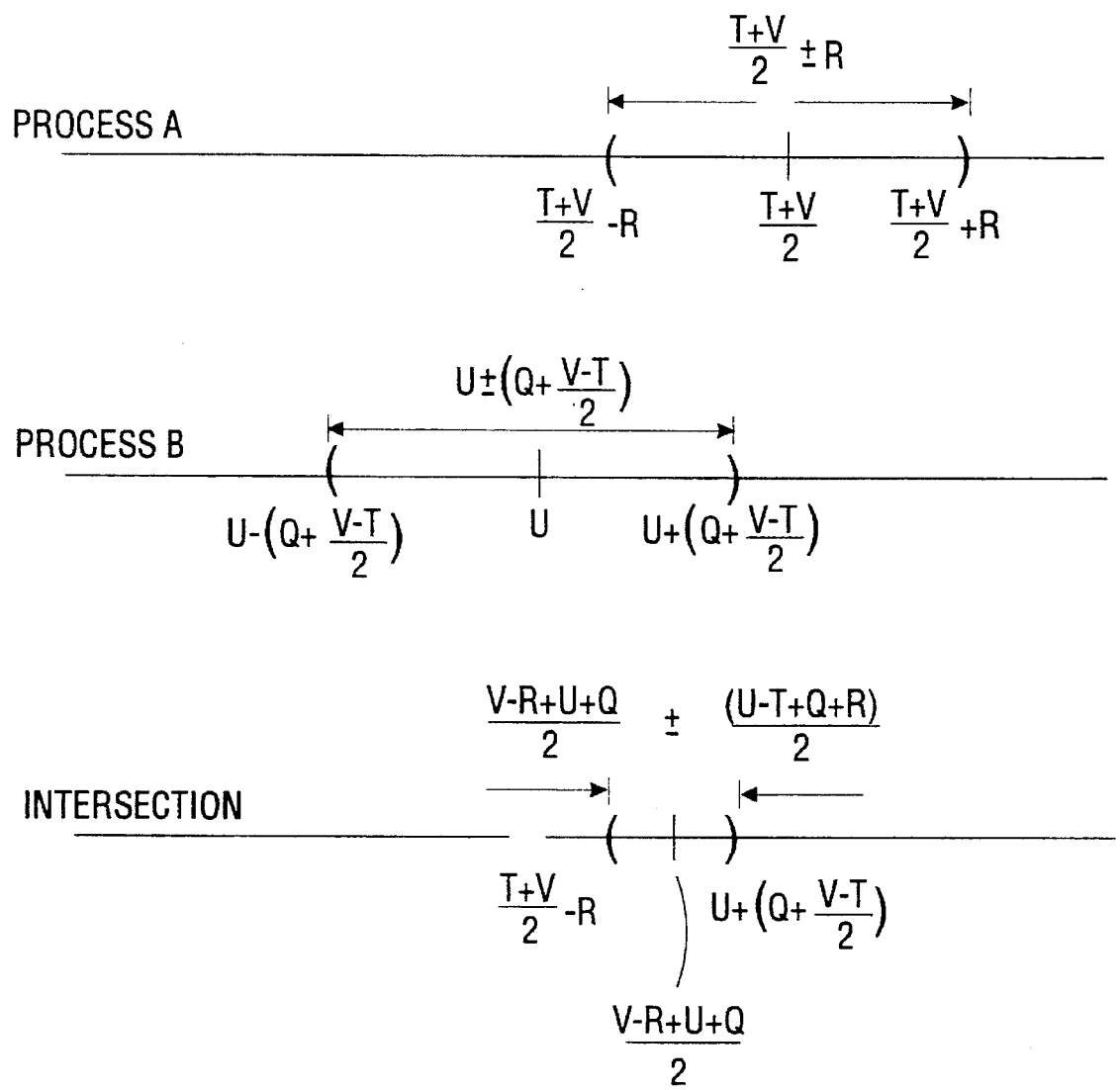

The two cases shown in FIGS. 5 and 6 are those for which, in accordance with the invention, the improved precision is achieved. In these two cases, the intersection between the two intervals is less than either of the two intervals in their respective entireties. However, the assumption is made that the correct time falls within the intersection of the two intervals. Thus, the precision achieved is related, not to the full size of either the Process A or the Process B interval, but, rather, to the smaller size of the intersection of the two intervals. Because of this assumption, the precision range of the intersection interval is smaller, and correspondingly better, than that achieved if either of the two intervals, in its entirety, were used for synchronization.

Let us consider first FIG. 5, which shows the result of a PCS message exchange in which the latter part of the Process A interval overlaps the initial part of the Process B interval. In accordance with the invention, the assumption is made that intersection of the two intervals encloses the correct time, so this interval may be used as the precision range for the newly synchronized time. In the scenario of FIG. 5, that interval runs from $U-(Q+(V-T)/2)$ to $(T+V)/2+R$. Since this interval is shorter than either of the Process A and B intervals, use of this interval as the precision range for the resynchronization produces advantageously greater precision.

There remains the task of determining where, within this interval, lies the time which will be taken as the instantaneous time. As discussed above, a precision is best when the precision range above and below the time are equal; that is, when the instantaneous time is the midpoint of the precision interval. Accordingly, the instantaneous time for the intersection interval of FIG. 5 may be computed from the sum of the two endpoints, divided by 2, or $(T+U-Q+R)/2$. Similarly, the precision range is given by taking the difference of the endpoints and dividing by 2, or $(V-U+R+Q)/2$.

Therefore, the synchronization is to be made by adjusting the instantaneous time of Process A to compensate for the difference between $(T+V)/2$ and the midpoint of the intersection interval, $(T+U-Q+R)/2$. Since the present time, according to Process A's time scale, is $V\pm R$, the midpoint is determined by adding, to the current time V, the compensation factor given by the difference $(T+U-Q+R)/2-(T+V)/2$. Thus, the new instantaneous time is $(V+U-Q+R)/2$. The plus-or-minus precision range is as given above Finally, let us consider FIG. 6, which shows the result of a PCS message exchange in which the initial part of the Process A interval overlaps the latter part of the Process B interval. In accordance with the invention, the assumption is again made that the falls within the intersection of the two intervals. In the scenario of FIG. 6, that interval runs from $(T+V)/2-R$ to $U+(Q+(V-T)/2)$. Since this interval is shorter than either of the Process A and B intervals, use of this interval as the precision range for the resynchronization also produces advantageously greater accuracy.

There remains the task of determining where, within this interval, lies the time which will be taken as the instantaneous time. Again, the instantaneous time is preferably taken as the midpoint of the precision interval. Accordingly, the instantaneous time for the intersection interval of FIG. 6 may be computed from the sum of the two endpoints, divided by 2, or $(V-R+U+Q)/2$. Similarly, the precision range is given by taking the difference of the endpoints and dividing by 2, or $(U-T+Q+R)/2$.

Therefore, the synchronization is to be made by adjusting the instantaneous time of Process A to compensate for the difference between $(T+V)/2$ and the indpoint of the intersection interval, $(V-R+U+Q)/2$. Since the present time, according to Process A's time scale, is $V\pm R$, the midpoint is determined by adding, to the current time V, the compensation factor given by the difference $(T+V)/2-(V-R+U+Q)/2$. Thus, the new instantaneous time is $V+(U+Q-R-T)/2$. The plus-or-minus precision range is as given above The above discussion provides a detailed mathematical analysis of the method of the invention, as preferably practiced using Process A and Process B synchronization intervals provided by means of a PCS message exchange, and by following the general assumption that the best overall precision for a time expressed in terms of an instantaneous time and a precision range having the instantaneous time as its midpoint. It will be understood, however, that other techniques can be used to identify Process A and Process B intervals which are to be used for synchronization. Also, the instantaneous time value need not be the midpoint of a precision interval, although, as discussed above, the precision is best when this is so. However, the analysis of the possible intersections of the two intervals to identify endpoints of the intersection intervals, and the identification of an instantaneous time point will proceed substantially as above, except for suitable alterations that satisfy the particular techniques used.

Figure 7:
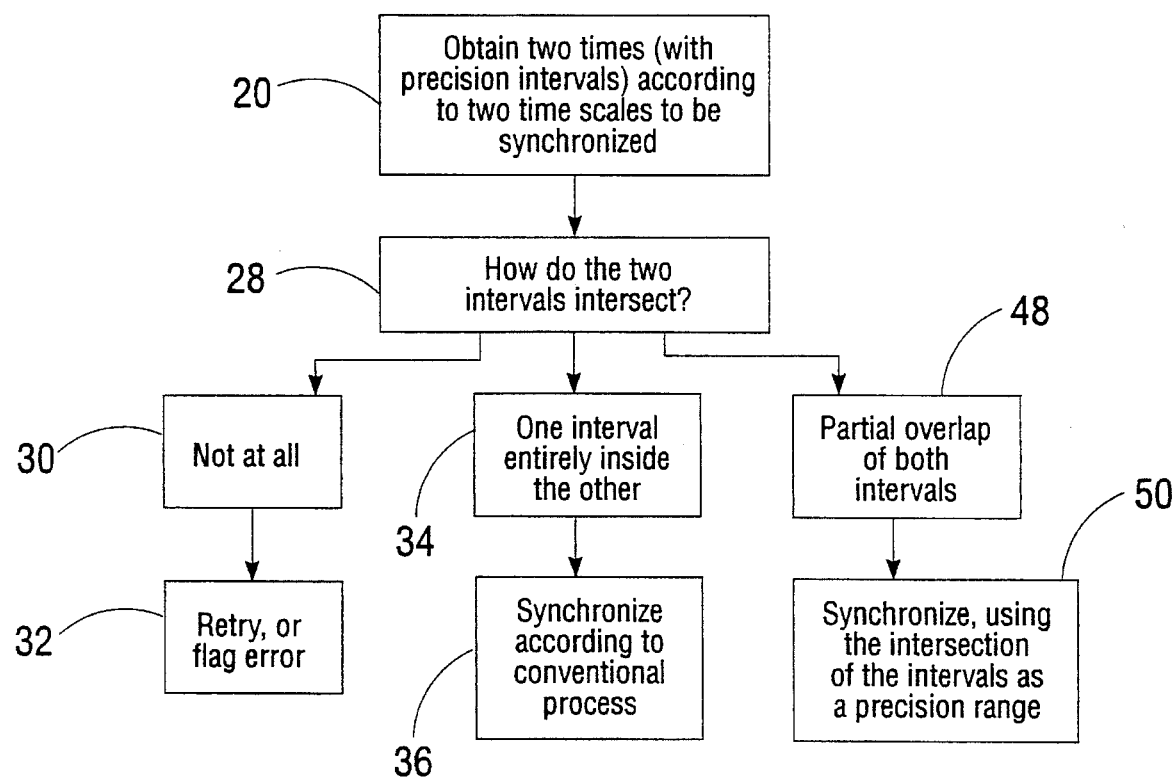
FIG. 7 is a flowchart showing a preferred implementation of the method of the invention.

The present discussion will conclude with a description of the method of the invention, as shown in the accompanying flowcharts. FIG. 7 is a flowchart showing the overall method of the invention. Initially, in step 20, two times, given in terms of an instantaneous time value and a precision range around that value, are obtained. As discussed above, this is preferably done through the use of a PCS message exchange sequence.

Figure 1:
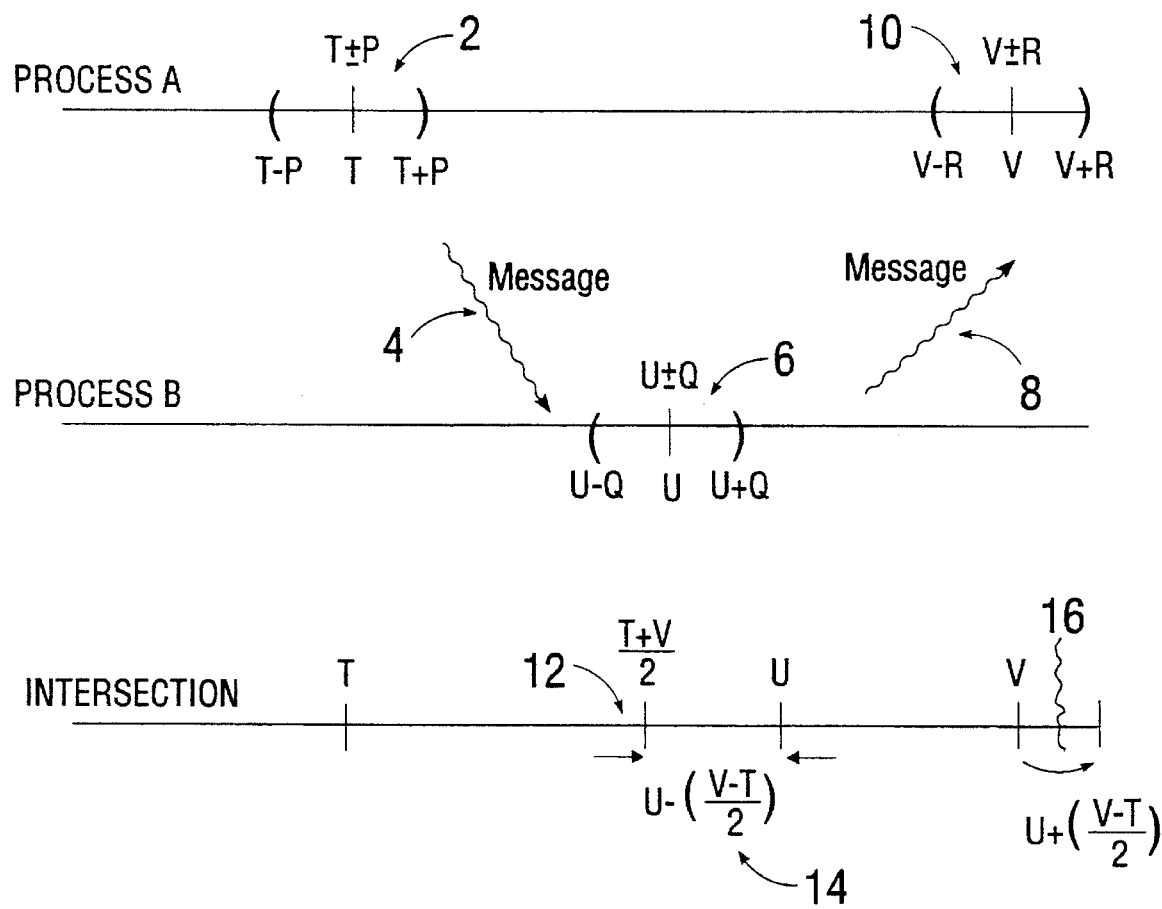
FIG. 1 is a timing diagram showing a round trip synchronization sequence according to the conventional Probabilistic Clock Synchronization method.
Figure 8:
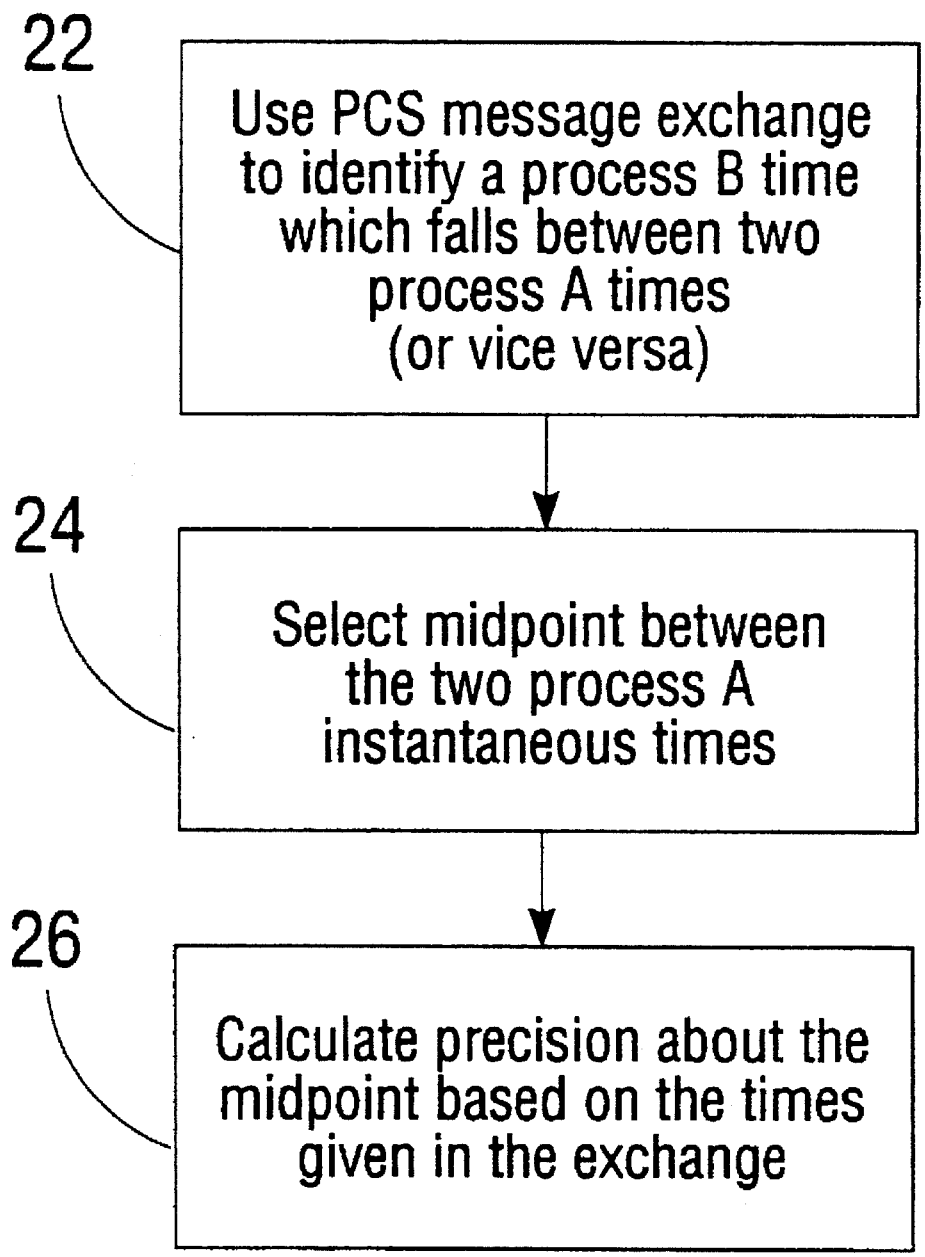
FIGS. 8, 9, and 10 are flowcharts showing a more detailed description of preferred embodiments of respective steps of FIG. 7.

Such an exchange is briefly summarized in FIG. 8. As discussed above in connection with FIG. 1, Process A sends a message at its time $T\pm P$. Process B later receives the message at a later time $U\pm Q$, and sends a response with a time stamp. Process A later receives the response, at its time $V\pm R$. Thus, it is established that the time $U\pm Q$ falls between the times $T\pm P$ and $V\pm R$. Step 22 in FIG. 8 shows this step.

Again, it should be borne in mind that a suitable message exchange could alternatively identify two Process B times, between which a Process A time falls. The remainder of the method of the invention is then suitably modified.

Referring again to FIG. 8, the instantaneous time according to Process A which is to be synchronized with the Process B time stamp (or vice versa, as above) is identified, preferably as the midpoint between the two times (step 24). Finally, a precision range interval about that instantaneous time is determined (step 26).

Returning now to FIG. 7, step 28 tests which of several possible intersection patterns result from the intersection of the Process B interval and the interval produced for Process A as per FIG. 8. If the intervals do not intersect at all (step 30), then the synchronization cannot proceed. A retry may be executed by repeating step 20, or a suitable error condition may be flagged, as appropriate (step 32).

If one interval falls completely inside the other (step 34), as illustrated in FIGS. 3 and 4, then the intersection of the intervals in accordance with the invention does not produce an advantageous improvement in precision. Rather, the precision achieved is the same as that according to conventional clock synchronization. Accordingly, Process A proceeds as per a conventional synchronization technique, either synchronizing, if a desired precision improvement would result, or, if it would not, then retrying or not proceeding further (step 36).

Figure 9:
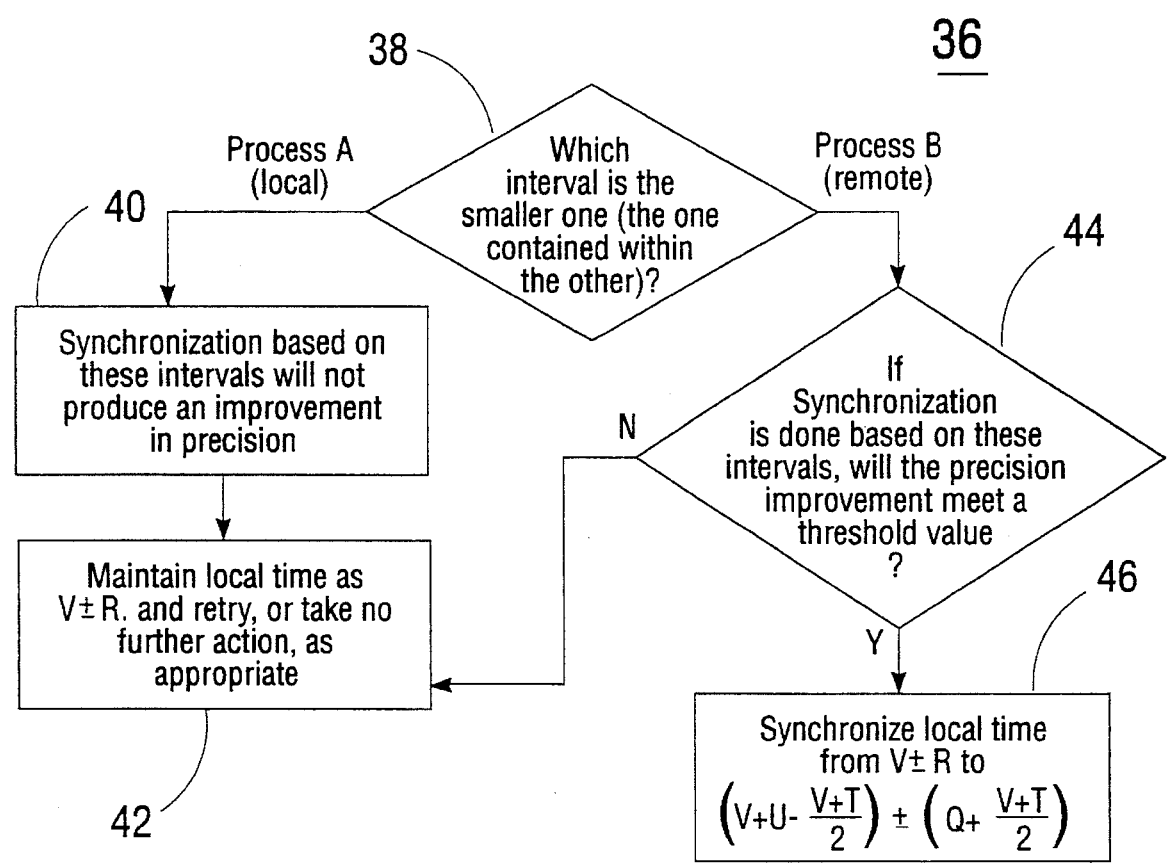

A more detailed description of step 36 is given in the flowchart of FIG. 9. The determination of which of the two cases (FIGS. 3 and 4) has occurred is given schematically as step 38. If the local interval (T+V)/2±R is smaller than, and contained entirely within, the remote interval U±(Q+(V−T)/2), so no improvement would result from the synchronization (step 40), then the local node simply maintains its time as V±R. Depending on the particular circumstances, the local node either retries the PCS message exchange to try to obtain a more favorable pair of intervals, or simple keeps its current time. This is shown in step 42.

On the other hand, if step 38 determines that the remote interval U±(Q+(V−T)/2) is smaller than, and contained entirely within, the local interval (T+V)/2±R, then the local node can improve its precision by performing the synchronization. Step 44 then tests whether the improvement in precision is great enough to satisfy a threshold condition. Any suitable threshold condition may optionally be used here. If not, the processing proceeds to step 42, as described above.

If, on the other hand, the precision improvement which would be realized by synchronization on these intervals is great enough to satisfy the threshold condition, then synchronization actually proceeds (step 46). As described in the Background, the local node synchronizes its time from V +R to (U+(V+T)/2)±(Q+(V−T)/2).

Let us now consider the remaining two cases provided for in FIG. 7. If the two intervals both partially overlap each other (step 48 ), then synchronization is performed, and a precision range is determined based on the intersection between the two intervals (step 50). This may be done using the formulas given above, or by suitable alternative formulas which would be derived, in the same manner as given above, based on the particular circumstances in the alternative situation.

Figure 10:
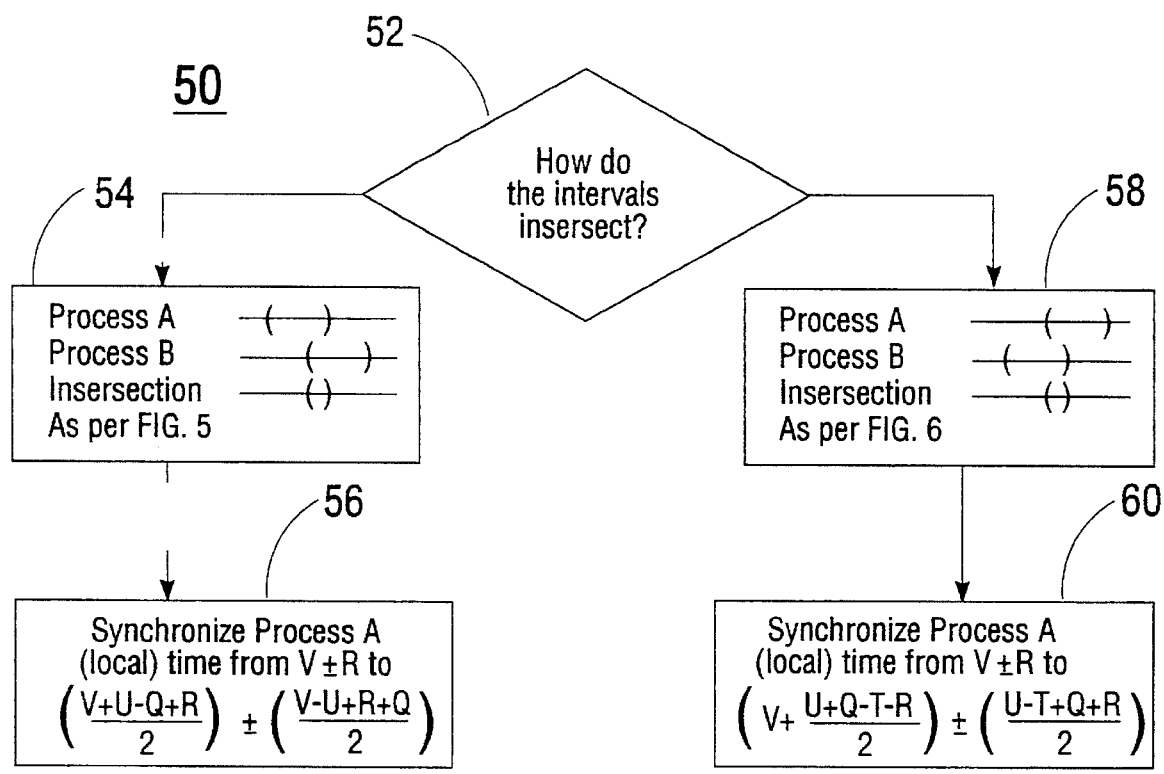
Figure 11:
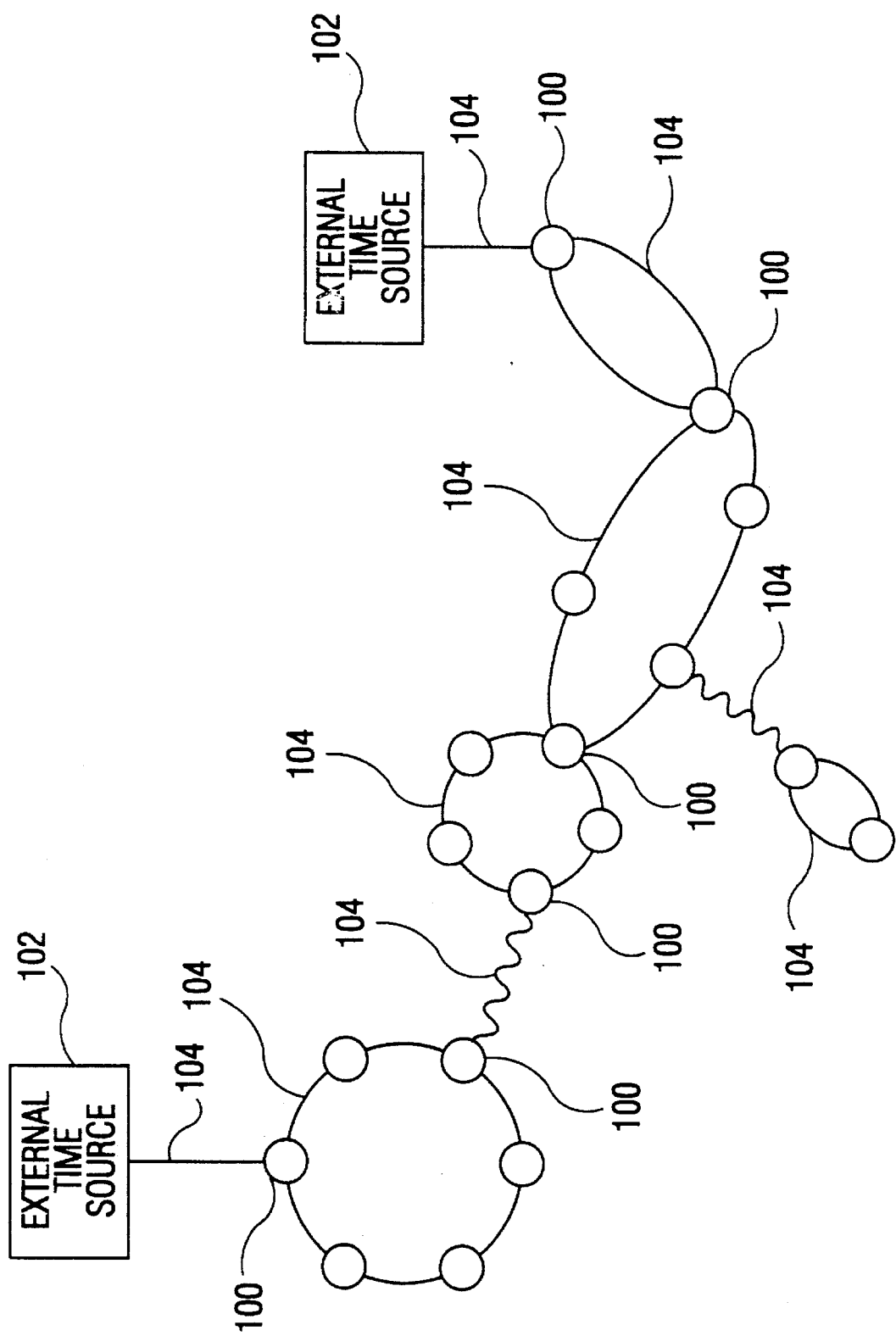
FIG. 11 is a block diagram showing a system for practicing the method of the invention.
Figure 12:
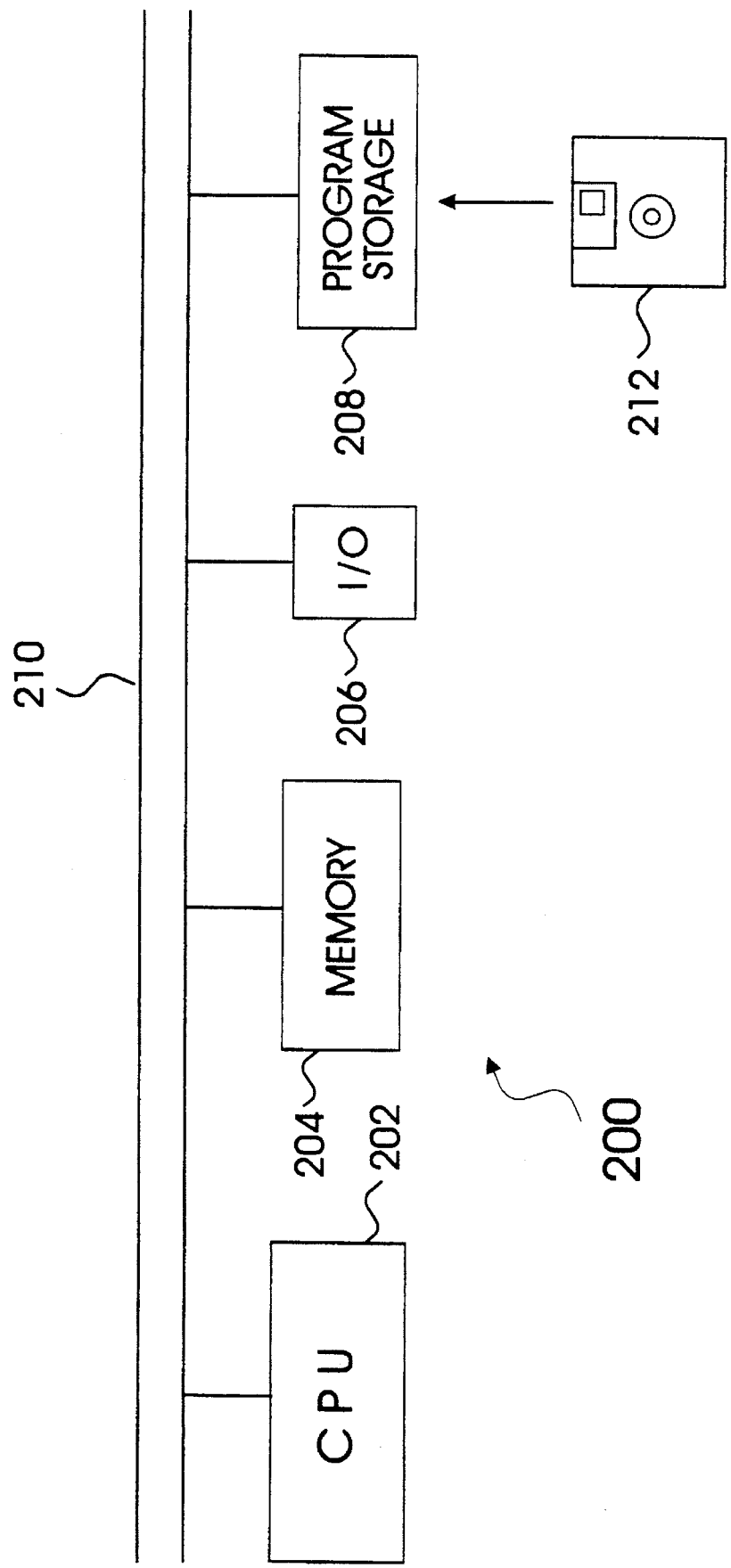
FIG. 12 is a schematic diagram of a processor (i.e., node) according to the invention.

FIG. 10 is a more detailed flowchart showing the operation of step 50 of FIG. 7. Initially, a determination is made as to how the two intervals overlap. For convenience, this is shown as a test step 52. The two possible intersection patterns are as given in FIGS. 5 and 6, so for convenience, steps are shown which refer to FIGS. 5 and 6, respectively.

If the intervals intersect as per FIG. 5 (step 54), then the Process A (local) time is synchronized as per the discussion given in connection with FIG. 5 (step 56). If they intersect as per FIG. 6 (step 58), then the intervals intersect as per the discussion given in connection with FIG. 6 (step 60).

Therefore, in either event, Process A's current time V will have been synchronized in accordance with a difference between Process A's previous time (T+V)/2 and the midpoint of the intersection interval, given by the appropriate formula. The new precision for the Process A time is given by the size of the intersection interval. Accordingly, an improved precision is obtained where the intersection is smaller than either of the Process A or Process B intervals, taken by themselves.

Those skilled in the art will recognize that the foregoing description has been presented for the purposes of illustration and description only. It is not intended to be exhaustive or to limit the invention to the precise forms disclosed, and obviously many modifications and variations are possible in light of the above teachings.

Therefore, the embodiments set forth herein are presented in order to best explain the principles of the present invention and its practical applications to thereby enable others skilled in the art to best utilize the present invention in various embodiments, modifications, and equivalents as are suited to the particular use contemplated.

What is claimed is:

1. For use with a system including a node coupled to a communication network, the node maintaining an internal time representation, a method for synchronizing the internal time representation with a remote time representation maintained elsewhere in the system, each of the internal and remote time representations including an instantaneous time and a precision range about the instantaneous time, the method comprising the steps, executed by the node, of:

identifying a first time for the internal time representation of the node and a second time for the remote time representation, the precision range of the first and second times forming respective first and second time intervals, the synchronization to be performed based on the first and second time intervals; and synchronizing the internal time representation, in terms of a new instantaneous time and a new precision range thereabout, the precision range thereabout being based on an intersection between the first and second time intervals.

2. A method as recited in claim 1, wherein:

the remote time representation is maintained by a remote time source elsewhere in the system; and the step of identifying includes exchanging a predetermined sequence of messages between the node and the remote time source, the sequence of messages including a message bearing a time stamp from the remote time source.

3. A method as recited in claim 2, wherein the step of identifying further includes:

receiving the message beating the time stamp; and determining the second time interval based on the time stamp.

4. A method as recited in claim 2, wherein the step of exchanging includes exchanging messages according to a probabilistic clock synchronization protocol.

5. A method as recited in claim 2, wherein the step of synchronizing includes:

identifying an intersection pattern between the first and second time intervals from a predetermined set of intersection patterns; and synchronizing based on the intersection pattern.

6. A method as recited in claim 5, wherein: the step of synchronizing based on the intersection pattern includes calculating a new instantaneous time and precision range in terms of the time values and precision ranges of the intervals of the messages exchanged in the step of exchanging, from one of a predetermined number of respective formulas, the formulas corresponding with the set of intersection patterns.

7. A method as recited in claim 1, further comprising the steps of:

determining a precision of synchronization which can be realized by synchronizing based on the identified first and second times;

comparing the precision determined in the step of determining with a predetermined threshold precision; and, if the precision determined in the step of determining is less precise than the predetermined threshold precision, then repeating the step of identifying, in order to identify a new first time for the internal time representation of the node and a new second time for the remote time representation, the precision range of the new first and new second times forming respective new first and new second time intervals, the synchronization to be performed based on the new first and new second time intervals.

8. A system comprising:

a communication network; and a node coupled to the communication network, the node maintaining an internal time representation, the node including:

means for synchronizing the internal time representation with a remote time representation maintained elsewhere in the system, each of the internal and remote time representations including an instantaneous time value and a precision range about the instantaneous time, the means for synchronizing including:

means for identifying a first time for the internal time representation of the node and a second time for the remote time representation, the precision range of the first and second times forming respective first and second time intervals, the synchronization to be performed based on the first and second time intervals; and means for synchronizing the internal time representation, in terms of a new instantaneous time and a new precision range thereabout, the precision range thereabout being based on an intersection between the first and second time intervals.

9. A system as recited in claim 8, further comprising:

a remote time source for maintaining the remote time representation; and wherein the means for identifying includes means for exchanging a predetermined sequence of messages between the node and the remote time source, the sequence of messages including a message bearing a time stamp from the remote time source.

10. A system as recited in claim 9, wherein the means for identifying further includes:

means for receiving the message bearing the time stamp; and means for determining the second time interval based on the time stamp.

11. A system as recited in claim 9, wherein the means for exchanging includes means for exchanging messages according to a probabilistic clock synchronization protocol.

12. A system as recited in claim 9, wherein the means for synchronizing includes:

means for identifying an intersection pattern between the first and second time intervals from a predetermined set of intersection patterns; and means for synchronizing based on the intersection pattern.

13. A system as recited in claim 12, wherein:

the means for synchronizing based on the intersection pattern includes means for calculating a new instantaneous time and precision range in terms of the time values and precision ranges of the intervals of the messages exchanged by the means for exchanging, from one of a predetermined number of respective formulas, the formulas corresponding with the set of intersection patterns.

14. A system as recited in claim 8, further comprising:

means for determining a precision of synchronization which can be realized by synchronizing based on the identified first and second times;

means for comparing the precision determined by the means for determining with a predetermined threshold precision; and, means, operable if the precision determined by the means for determining is less precise than the predetermined threshold precision, for repeating operation of the means for identifying, in order to identify a new first time for the internal time representation of the node and a new second time for the remote time representation, the precision range of the new first and new second times forming respective new first and new second time intervals, the synchronization to be performed based on the new first and new second time intervals.

15. A node, for use with a system including a communication network and for coupling thereto, the node maintaining an internal time representation, the node comprising:

means for synchronizing the internal time representation with a remote time representation maintained elsewhere in the system, each of the internal and remote time representations including an instantaneous time and a precision range about the instantaneous time, the means for synchronizing including:

means for identifying a first time for the internal time representation of the node and a second time for the remote time representation, the precision range of the first and second times forming respective first and second time intervals, the synchronization to be performed based on the first and second time intervals; and means for synchronizing the internal time representation, in terms of a new instantaneous time and a new precision range thereabout, the precision range thereabout being based on an intersection between the first and second time intervals.

16. A node as recited in claim 15, wherein:

the remote time representation is maintained by a remote time source elsewhere in the system; and the means for identifying includes means for exchanging a predetermined sequence of messages between the node and the remote time source, the sequence of messages including a message beating a time stamp from the remote time source.

17. A node as recited in claim 16, wherein the means for identifying further includes:

means for receiving the message beating the time stamp; and means for determining the second time interval based on the time stamp.

18. A node as recited in claim 16, wherein the means for exchanging includes means for exchanging messages according to a probabilistic clock synchronization protocol.

19. A node as recited in claim 16, wherein the means for synchronizing includes:

means for identifying an intersection pattern between the first and second time intervals from a predetermined set of intersection patterns; and means for synchronizing based on the intersection pattern.

20. A node as recited in claim 19, wherein:

the means for synchronizing based on the intersection pattern includes means for calculating a new instantaneous time and precision range in terms of the time values and precision ranges of the intervals of the messages exchanged by the means for exchanging, from one of a predetermined number of respective formulas, the formulas corresponding with the set of intersection patterns.

21. A node as recited in claim 15, further comprising:

means for determining a precision of synchronization which can be realized by synchronizing based on the identified first and second times;

means for comparing the precision determined by the mans for determining with a predetermined threshold precision; and, means, operable if the precision determined by the means for determining is less precise than the predetermined threshold precision, for repeating operation of the means for identifying, in order to identify a new first time for the internal time representation of the node and a new second time for the remote time representation, the precision range of the new first and new second times forming respective new first and new second time intervals, the synchronization to be performed based on the new first and new second time :intervals.

22. A computer program product, for use with a processor serving as a node of a system including nodes and a communication network coupled between the nodes, the node maintaining an internal time representation, for directing the node to synchronize the internal time representation with a remote time representation maintained elsewhere in the system, each of the internal and remote time representations including an instantaneous time and a precision range about the instantaneous time, the computer program product comprising:

a recording medium;

means, recorded on the recording medium, for directing the node to identify a first time for the internal time representation of the node and a second time for the remote time representation, the precision range of the first and second times forming respective first and second time intervals, the synchronization to be performed based on the first and second time intervals; and means, recorded on the recording medium, for directing the node to synchronize the internal time representation, in terms of a new instantaneous time and a new precision range thereabout, the precision range thereabout being based on an intersection between the first and second time intervals.

23. A computer program product as recited in claim 22, wherein:

the remote time representation is maintained by a remote time source elsewhere in the system; and the means for directing to identify includes means, recorded on the recording medium, for directing the node to exchange a predetermined sequence of messages between the node and the remote time source, the sequence of messages including a message bearing a time stamp from the remote time source.

24. A computer program product as recited in claim 23, wherein the means for directing to identify further includes:

means, recorded on the recording medium, for directing the node to receive the message bearing the time stamp; and means, recorded on the recording medium, for directing the node to determine the second time interval based on the time stamp.

25. A computer program product as recited in claim 23, wherein the means for directing to exchange includes means, recorded on the recording medium, for directing the node to exchange messages according to a probabilistic dock synchronization protocol.

26. A computer program product as recited in claim 23, wherein the means for directing to synchronize includes:

means, recorded on the recording medium, for directing the node to identify an intersection pattern between the first and second time intervals from a predetermined set of intersection patterns; and means, recorded on the recording medium, for directing the node to synchronize based on the intersection pattern.

27. A computer program product as recited in claim 26, wherein:

the means for directing to synchronize based on the intersection pattern includes means, recorded on the recording medium, for directing the node to calculate a new instantaneous time and precision range in terms of the time values and precision ranges of the intervals of the messages exchanged by the means for directing to exchange, from one of a predetermined number of respective formulas, the formulas corresponding with the set of intersection patterns.

28. A computer program product as recited in claim 22, further comprising:

means, recorded on the recording medium, for directing the node to determine a precision of synchronization which can be realized by synchronizing based on the identified first and second times;

means, recorded on the recording medium, for directing the node to compare the precision determined by the means for directing to determine with a predetermined threshold precision; and, means, recorded on the recording medium, operable if the precision determined by the means for directing to determine is less precise than the predetermined threshold precision, for repeating operation of the means for directing to identify, in order to identify a new first time for the internal time representation of the node and a new second time for the remote time representation, the precision range of the new first and new second times forming respective new first and new second time intervals, the synchronization to be performed based on the new first and new second time intervals.

* * * * *